United States Patent
Co et al.

(10) Patent No.: US 10,639,964 B2
(45) Date of Patent: May 5, 2020

(54) AIR VENT WITH FORCED AIR FEATURE

(71) Applicant: FORD GLOBAL TECHNOLOGIES, LLC, Dearborn, MI (US)

(72) Inventors: Juanito Yu Co, Ann Arbor, MI (US); Leonard Anthony Shaner, New Baltimore, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1194 days.

(21) Appl. No.: 14/612,723

(22) Filed: Feb. 3, 2015

(65) Prior Publication Data

US 2015/0367707 A1    Dec. 24, 2015

Related U.S. Application Data

(63) Continuation of application No. 14/311,552, filed on Jun. 23, 2014, now Pat. No. 10,449,831.

(51) Int. Cl.
*B60H 1/24* (2006.01)
*B60H 1/26* (2006.01)
*B60J 1/20* (2006.01)

(52) U.S. Cl.
CPC .......... *B60H 1/267* (2013.01); *B60H 1/265* (2013.01); *B60J 1/20* (2013.01)

(58) Field of Classification Search
CPC ........ B60H 1/243; B60H 1/265; B60H 1/267; B60H 1/26; B60H 1/00828
USPC .... 454/131–133, 95, 97, 196, 208, 213, 128
See application file for complete search history.

(56) References Cited

U.S. PATENT DOCUMENTS

| | | | |
|---|---|---|---|
| 1,783,276 A | * | 12/1930 | Bliss .................... E06B 7/10 181/292 |
| 3,434,408 A | * | 3/1969 | Rivers .................. B60H 1/267 454/132 |
| 4,756,242 A | | 7/1988 | Keith |
| 4,864,920 A | | 9/1989 | Inagaki |
| 5,081,912 A | | 1/1992 | Clenet |
| 5,094,151 A | | 3/1992 | Bernard |
| 5,683,293 A | | 11/1997 | Mohammed |
| 5,797,645 A | | 8/1998 | Schenk et al. |

(Continued)

FOREIGN PATENT DOCUMENTS

| | | |
|---|---|---|
| CN | 1876416 A | 12/2006 |
| CN | 203580570 U | 5/2014 |

(Continued)

OTHER PUBLICATIONS

English translation of German Patent 19533596.

(Continued)

*Primary Examiner* — Steven B McAllister
*Assistant Examiner* — Ko-Wei Lin
(74) *Attorney, Agent, or Firm* — David Coppiellie; King & Schickli, PLLC (57) ABSTRACT

An air vent is mounted in a vehicle window frame. The air vent includes a one-piece body having an interior face and an exterior face. A passive ventilation feature includes an air pathway that extends between a first opening in the interior face to a second opening in the exterior face. A forced air ventilation feature is carried by the body. The forced air ventilation feature includes a ventilation fan, an exhaust outlet and a closure for the exhaust outlet that is displaceable between open and closed positions.

20 Claims, 11 Drawing Sheets

(56) References Cited

U.S. PATENT DOCUMENTS

| | | | |
|---|---|---|---|
| 6,042,473 A * | 3/2000 | McClary | B60H 1/267 |
| | | | 296/152 |
| 6,224,479 B1 | 5/2001 | Iino | |
| 6,350,195 B1 | 2/2002 | Iino | |
| 6,435,961 B1 | 8/2002 | Biancone | |
| 6,692,130 B1 | 2/2004 | Snow | |
| 7,762,876 B2 | 7/2010 | McClary | |
| 2004/0162017 A1 | 8/2004 | Pe'er et al. | |
| 2006/0199523 A1* | 9/2006 | Matthews | F24F 7/065 |
| | | | 454/251 |
| 2007/0135034 A1 | 6/2007 | Lack | |
| 2012/0028563 A1* | 2/2012 | Sacks | F24F 11/0001 |
| | | | 454/258 |

FOREIGN PATENT DOCUMENTS

| | | | |
|---|---|---|---|
| DE | 4437209 A1 | 8/1995 | |
| DE | 19533596 A1 | 3/1997 | |
| JP | 01190526 A * | 7/1989 | B60H 1/00471 |

OTHER PUBLICATIONS

English translation of German Patent 4437209.
English translation of Chinese Patent 1876416.
English translation of Chinese Patent 203580570.
Office Action dated May 3, 2018 for U.S. Appl. No. 14/311,552, filed Jun. 23, 2014.
Office Action dated Dec. 6, 2018 for U.S. Appl. No. 14/311,552, filed Jun. 23, 2014.

\* cited by examiner

AIR VENT WITH FORCED AIR FEATURE

This application is a continuation-in-part of U.S. patent application Ser. No. 14/311,552 filed on Jun. 23, 2014, entitled "Air Vent for Mitigating Hot Air in Vehicle" the full disclosure of which is incorporated herein by reference.

TECHNICAL FIELD

This document relates generally to the vehicle ventilation field and, more particularly, to a ventilation device mounted in a vehicle window having a forced air feature for ventilation exhaust of hot interior air from the vehicle.

BACKGROUND

Ventilation devices that may be fitted in the top of a frame of a vehicle window in order to ventilate hot air from the interior thereof are known in the art. Examples of such devices are disclosed in U.S. Pat. No. 7,762,876 to McClary, U.S. Pat. No. 6,224,479 to Iino, U.S. Pat. No. 5,094,151 to Bernard, U.S. Pat. No. 4,864,920 to Inagaki and U.S. Pat. No. 3,434,408 to Rivers et al.

This document relates to a new and improved air vent for mounting in a vehicle window frame incorporating a passive ventilation feature and a forced air ventilation feature wherein the forced air ventilation feature includes a ventilation fan, an air exhaust outlet and a closure for the exhaust outlet displaceable between an open position to allow ventilation of hot air from the vehicle and a closed position to seal the opening from intrusion.

SUMMARY

In accordance with the purposes and benefits described herein, an air vent is provided for mounting in a vehicle window frame. The air vent comprises a body having an interior face and an exterior face, a passive ventilation feature and a forced air ventilation feature. The passive ventilation feature includes an air pathway extending from a first opening in the interior face to a second opening in the exterior face. The forced air ventilation feature includes a ventilation fan, an air exhaust outlet and a closure for the exhaust outlet that is displaceable between an open position and a closed position. The air vent further includes an actuator for opening and closing the exhaust outlet closure. In one possible embodiment, the actuator is a solenoid. In another possible embodiment, the actuator is an electric motor. Further, the air vent includes a power source. In one possible embodiment, that power source is a battery. In another possible embodiment, that power source is a solar cell.

Still further, the air vent includes a controller. That controller may be connected to a temperature sensor, so as to activate the ventilation fan in response to a predetermined interior temperature, and a timer to operate the fan for a particular cycle time after activation.

In one possible embodiment, the closure comprises a rotating door. In another possible embodiment, the closure comprises an iris opening with three radially displaceable shields. In yet another possible embodiment, the closure comprises a pivoting door.

In one useful embodiment, the air pathway extends downward from the first opening to the second opening so as to better prevent intrusion of rain or moisture into the interior of the vehicle.

In one useful embodiment, the air pathway includes a central cavity. A first portion of the air pathway extends between the first hole and the central cavity while a second portion extends between the second hole and the central cavity. In one possible embodiment, the first portion and second portion of the air pathway are non-collinear. In another possible embodiment, the first portion and second portion of the air pathway are non-planar and non-collinear. In yet another embodiment, the air pathway further includes multiple first portions and multiple second portions.

In accordance with additional aspects, the body of the device may include an elongated mounting flange. In one embodiment, the body also includes an elongated window channel for receiving and holding the window that operates in the window frame in which the device is mounted. In one possible embodiment, that window channel is open to the central cavity. In another possible embodiment, the central cavity is separate from the window channel. In yet another possible embodiment, the body has a substantially h-shaped cross section.

In the following description, there are shown and described several preferred embodiments of the air vent. As it should be realized, the air vent is capable of other, different embodiments and its several details are capable of modification in various, obvious aspects all without departing from the air vent as set forth and described in the following claims. Accordingly, the drawings and descriptions should be regarded as illustrative in nature and not as restrictive.

BRIEF DESCRIPTION OF THE DRAWING

The accompanying drawing incorporated herein and forming a part of the specification, illustrates several aspects of the air vent and together with the description serves to explain certain principles thereof. In the drawing:

FIG. 9b is a schematic block diagram of the control circuit for the forced air ventilation feature illustrated in FIG. 9a.

Reference will now be made in detail to the present preferred embodiments of the air vent, examples of which are illustrated in the accompanying drawings.

DETAILED DESCRIPTION

Figure 1:
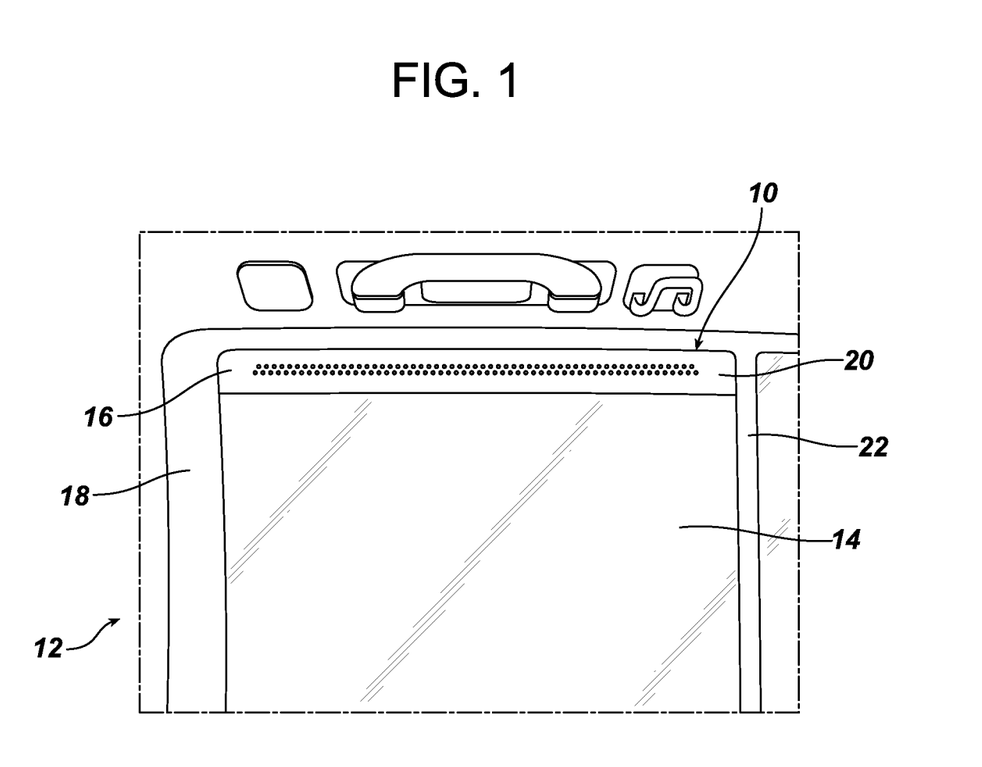
FIG. 1 is an interior elevational view illustrating the air vent mounted in the top portion of a vehicle window frame with the top of the window received in an elongated window channel provided in the air vent.

Reference is now made to FIG. 1 illustrating the air vent 10 mounted at the top of a vehicle window frame 12 and engaging the top of the window 14. As illustrated, the air vent 10 has a front end 16 adjacent the front portion 18 of the window frame 12 and a rear end 20 adjacent the rear portion 22 of the window frame.

Figure 2:
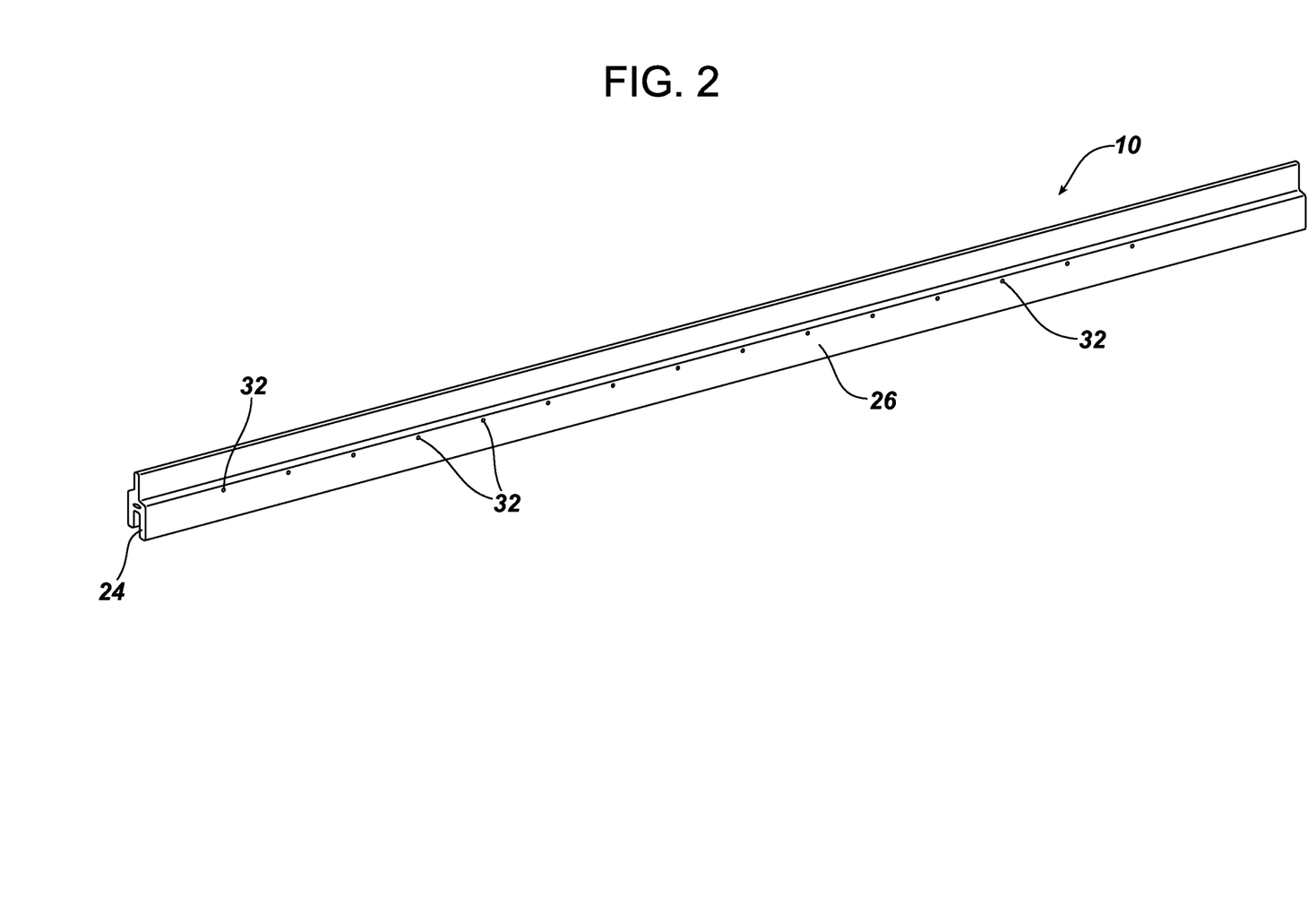
FIG. 2 is a perspective view of the interior face of another embodiment of the air vent.
Figure 3A:
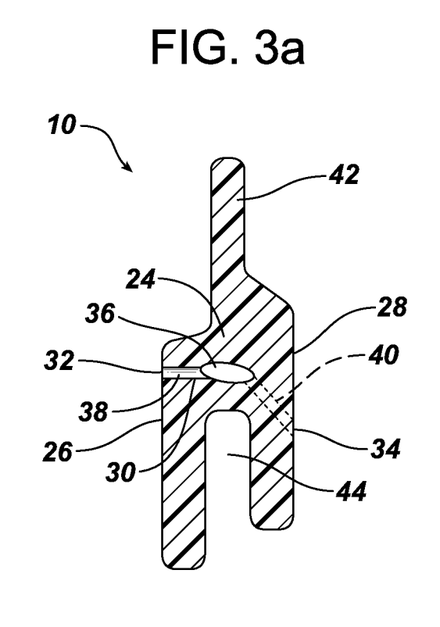
FIGS. 3a and 3b are cross-sectional views of one embodiment of the air vent wherein the first and second portions of the air pathway are non-planar and non-collinear.
Figure 3B:
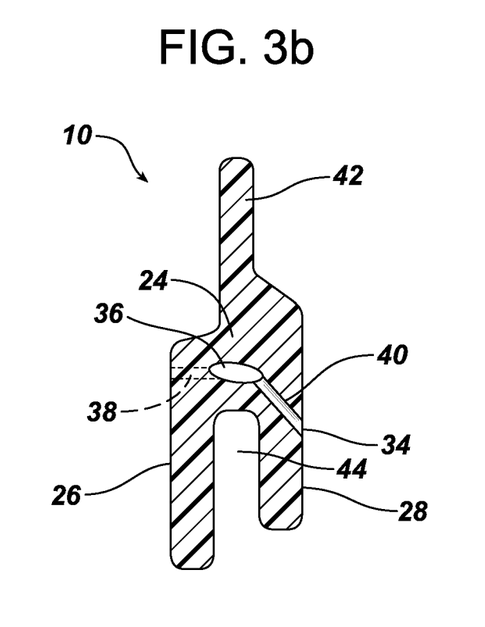

As best illustrated in FIGS. 2, 3a and 3b, the air vent 10 includes a one-piece body 24 having an interior face 26 and an exterior face 28. An air pathway 30 extends from a first opening 32 in the interior face 26 to a second opening 34 in the exterior face 28.

In the FIGS. 3a and 3b embodiment, the air pathway includes a central cavity 36 with a first portion 38 of the air pathway extending between the first opening 32 and the central cavity and a second portion 40 of the air pathway extending from the central cavity to the second opening 34.

As further illustrated in FIGS. 3a and 3b, the body 24 is generally h-shaped and further includes an elongated mounting flange 42 and an elongated window channel 44. As should be appreciated, the elongated central cavity 36 is positioned between the elongated mounting flange 42 and the elongated window channel 44. The significance and function of the elongated mounting flange 42 and elongated window channel 44 will be discussed in detail below.

In the embodiment illustrated in FIGS. 3a and 3b, the first air pathway portion 38 and the second air pathway portion 40 are non-collinear and non-planar. Non-collinear means the first and second airway portions 38, 40 do not extend in a straight line. Non-planar means that the first and second airway portions 38, 40 are not aligned in the same plane.

Figure 3C:
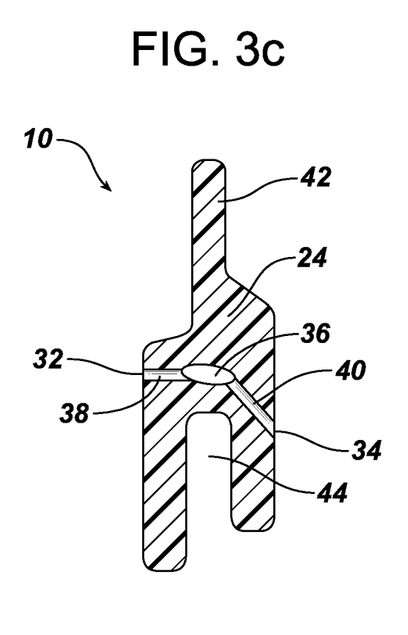
FIG. 3c is a cross-sectional view of one embodiment of the air vent wherein the first and second portions of the air pathway are planar but non-collinear.

FIG. 3c is a cross-sectional view illustrating an additional embodiment wherein the first and second air pathway portions 38, 40 are non-collinear but are planar.

Figure 4:
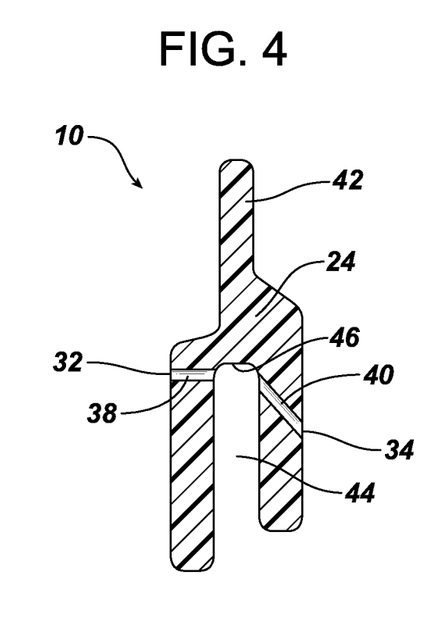
FIG. 4 is a cross-sectional view of another embodiment incorporating a window channel in communication with the first and second portions of the air pathway.

FIG. 4 illustrates yet another embodiment wherein the elongated window channel 44 extends to and is in communication with the first and second air pathway portions 38, 40 and there is no separate central cavity. When the window is fully closed in this embodiment, the top of the window engages the top 46 of the window channel 44 thereby closing off the air pathway 30 by interrupting flow between the first portion 38 and second portion 40.

Figure 5:
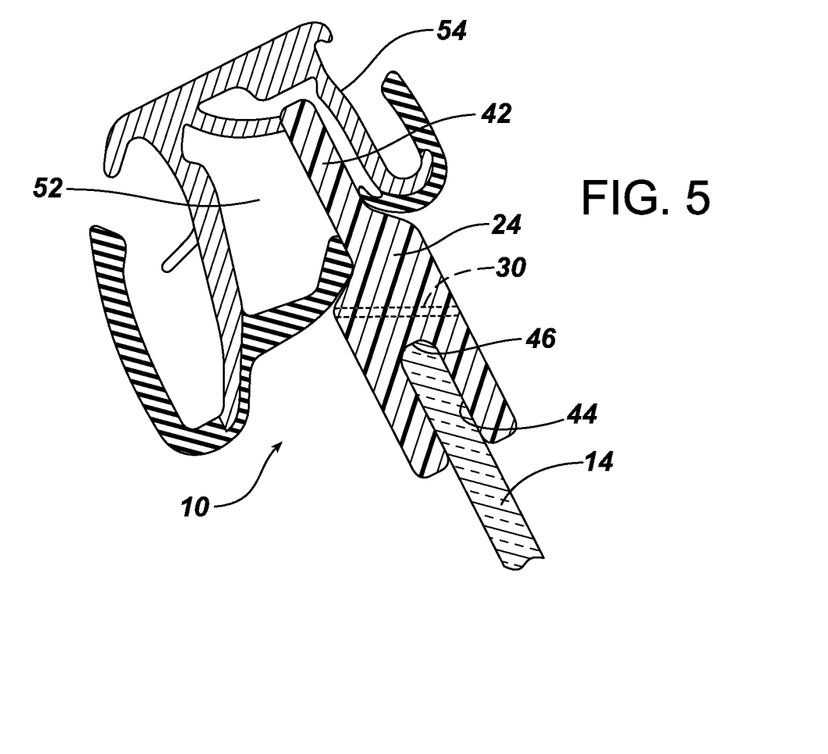
FIG. 5 is a cross-sectional view of yet another embodiment wherein the air pathway is separate from the window channel. This figure also illustrates the manner in which the elongated mounting flange of the air vent is received in the standard window gasket of the vehicle.

FIG. 5 shows yet another embodiment wherein the air pathway 30 comprises a straight path from the first opening 32 to the second opening 34. In this embodiment note that the elongated window channel 44 does not extend into communication with the air pathway 30 and thus the air pathway is always open even when the window is fully closed.

Figure 6:
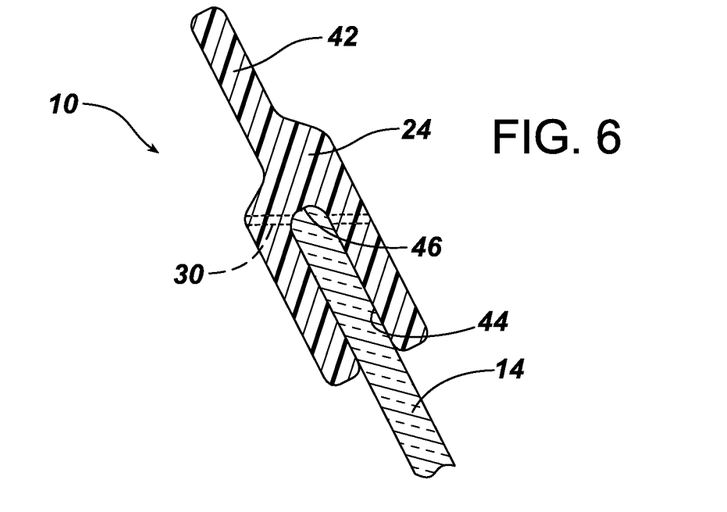
FIG. 6 illustrates another embodiment similar to the FIG. 5 embodiment except for the fact that the window channel extends to and communicates with the first and second portions of the air pathway.

In contrast, in the FIG. 6 embodiment, the elongated window channel 44 extends into communication with the air pathway 30 so that when the window is fully closed, the air pathway 30 is closed between the first portion 38 and the second portion 40 to prevent any air circulation through the air pathway.

Figure 7:
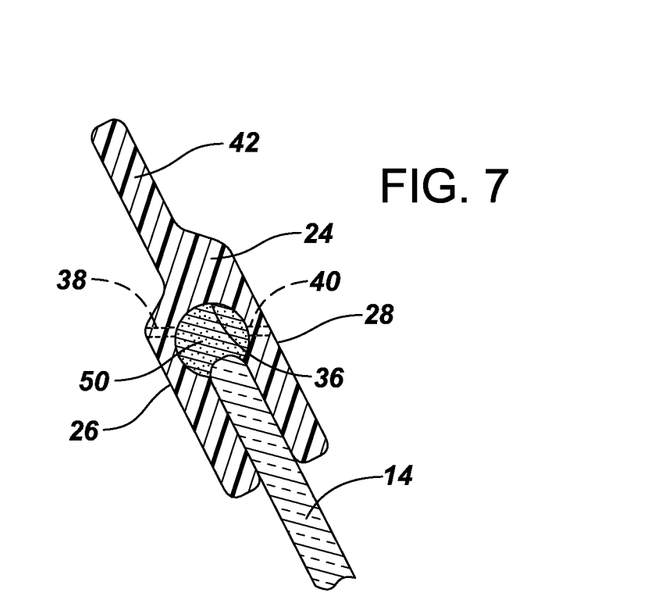
FIG. 7 illustrates yet another embodiment wherein the air vent incorporates a central cavity which receives and holds a filter.

In the embodiment illustrated in FIG. 7, a filter 50 is provided in the central cavity 36 between the first and second air pathway portions 38, 40. The filter 50 may be made from any appropriate material including, for example, porous foam, paper microfilter, plastic microfilter, water vapor barrier membrane and combinations thereof. Further, the filter 50 may include activated carbon or other appropriate material for deodorizing air and capturing contaminants that may otherwise pass through the air vent from the exterior to the interior of the vehicle under certain operating conditions. This filter 50 may be made in the shape of a rod which is pushed upward into the cavity 36.

In any of the illustrated embodiments, the one-piece body 24 may be made from a plastic or elastomeric material with a material durometer optimized between hardness and flexibility. The body 24 must have sufficient stiffness to allow proper mounting in the window frame. The material may be selected from a group of materials including, but not limited to, nylon, ABS, polyethylene, polypropylene, polylactic acid (PLA), stereolithography (SLA) resins (liquid UV-curable photopolymers) and combinations thereof. The material may incorporate various additives including, for example, UV protectants, anti-squeak agents such as polytetrafluoroethylene and colorants to, for example, blend with the tinted glass or match the body color of the vehicle. Of course, the material must withstand extreme temperatures and temperature cycles.

In any of the embodiments a water repellant film may be provided in the air pathway 30. Such a water repellant film may comprise a porous membrane made from, for example, expanded polytetrafluoroethylene material such as sold under the trademark GORE-TEX®. Other useful film materials include porous metal film and porous plastic film that include a number of tiny holes or apertures.

As best illustrated in FIG. 5, the air vent 10 may be mounted in the window frame by inserting the elongated mounting flange 42 into the channel 52 in the window weather stripping 54 which is designed to receive and hold the closed window 14. Since the air vent 10 is made from a single piece of plastic or elastomeric material with no moving parts, it will operate over a long service life without rattling, squeaking or producing any other sounds that might otherwise annoy an occupant of a vehicle.

As should be further appreciated, the exterior face 28 of the illustrated embodiments is flat so as to provide an aerodynamically neutral surface which does not create any currents or any whistling or other wind noises when the vehicle is operated at speed. At the same time, the air pathway 30 which typically comprises a plurality of air pathways extending from a plurality of first openings 32 to a plurality of second opening 34 along the length of the air vent allows for excellent passive cooling of the vehicle. More specifically, the temperature of the air inside the vehicle at rest in the hot summer sun rapidly rises. The heated air produces a positive pressure which forces the hottest rising air out through the air pathway 30.

Typically, the first and second portions 38, 40 of the air pathway 30 have a diameter of a maximum of about 5 mm. In one possible embodiment, the pathways 30 have a diameter of between 2 mm and 3 mm. The diameter of the first and second portions 38, 40 of the air pathway 30 need not be the same. Further, the portions 38, 40 of the air pathway 30 may be of constant diameter or tapered. In one embodiment the portion 38 is tapered and the portion 40 is constant. The larger end of the tapered portion 38 may be open to the interior of the vehicle.

Figure 9A:
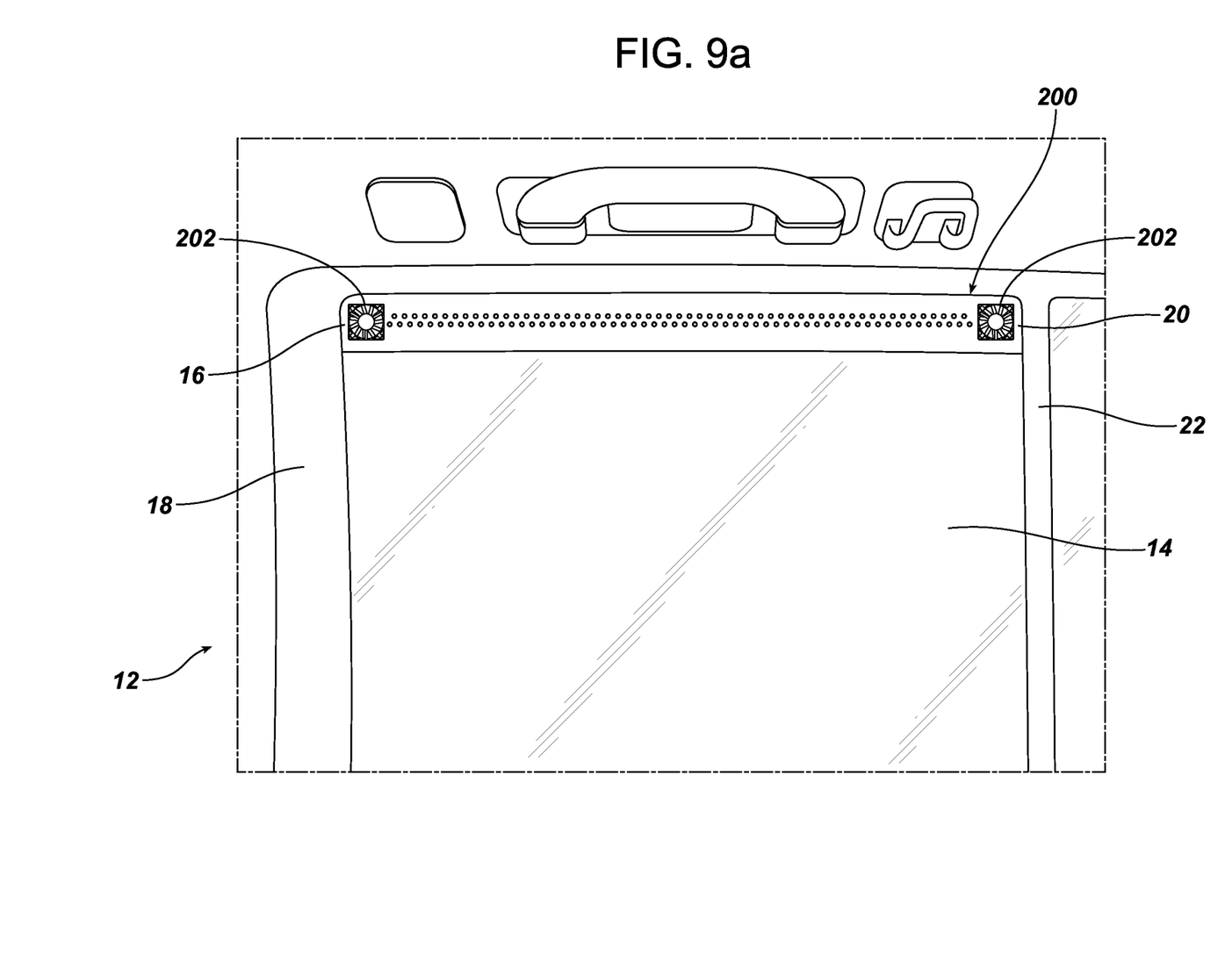
FIG. 9a is an interior elevational view illustrating another embodiment of the air vent incorporating a forced air ventilation feature.
Figure 9B:
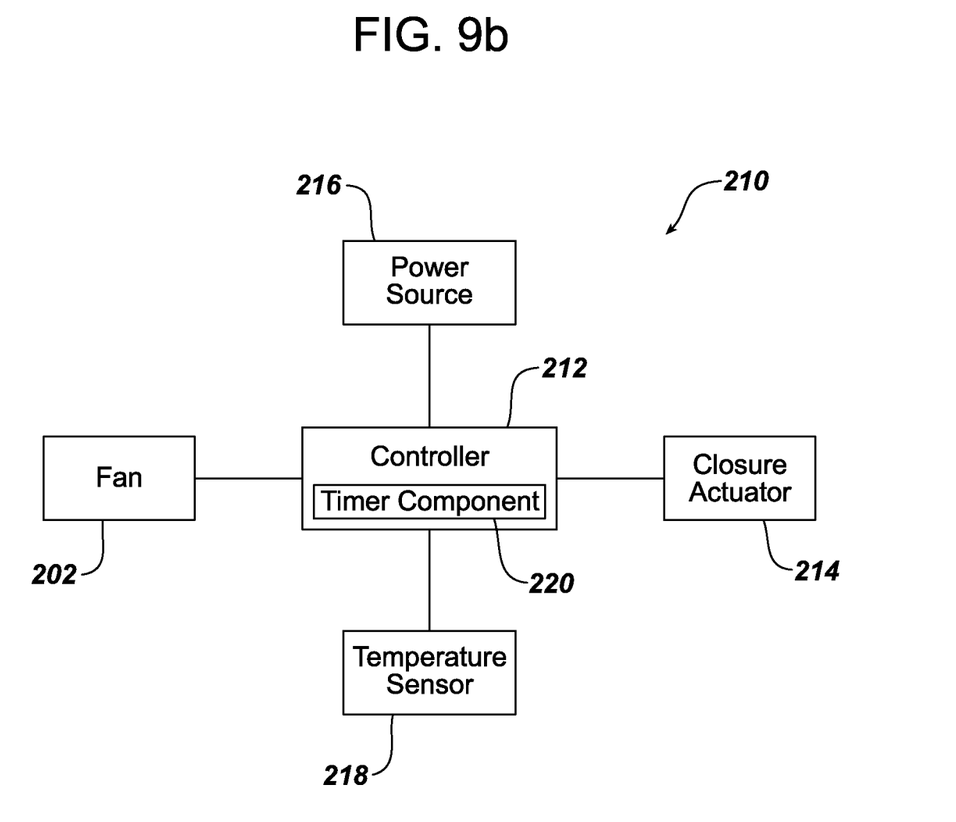

Reference is now made to FIGS. 9a and 9b illustrating yet another embodiment of air vent 200. In this embodiment, the one-piece body 24 still has an interior face 26 and an exterior face 28. Multiple air pathways 30 extend from a first opening in the interior face 26 to a second opening in the exterior face 28. In addition to the passive ventilation feature formed by the air pathways 30, the air event 200 in the embodiment of FIGS. 9a and 9b further includes a forced air ventilation feature comprising one or more ventilation fans 202, an air exhaust outlet 204 on the exterior face 28 for each ventilation fan and a closure 206 for each exhaust outlet that is displaceable between an open position and a closed position.

The control system 210 of the air vent 200 is illustrated schematically in FIG. 9b. As illustrated, the control system 210 includes a controller 212 in the form of a computing device, such as a dedicated microprocessor or electronic control unit (ECU) comprising one or more processors, one or more memories and one or more network interfaces. The controller 212 is operably connected to the ventilation fan 202 and to a closure actuator 214. As illustrated, the controller 212 is also connected to a power source 216 and a temperature sensor 218. Further, the controller 212 may also include an internal timer component 220.

In one possible embodiment, the controller 212 is configured to open and close the closure as necessary by means of the closure actuator 214 and activate and deactivate the ventilation fan 202 in response to the temperature sensor 218 for a predetermined period of time as determined by the timer component 220. More specifically, as the motor vehicle sits parked in the sun, the temperature of the interior of the vehicle begins to rise. This temperature is continuously monitored by the temperature sensor 218 which transmits a signal to the control 212 indicative of the temperature. Upon the temperature rising to a predetermined value, the controller 212 sends a signal to the closure actuator 214 causing the exhaust outlet closure 206 to open. Next, the controller 212 sends a signal to activate the ventilation fan 202 which exhausts hot air from the vehicle while drawing in cool air from outside. Power for the operation of all of the components of the control system 210 is provided by the power source 216. That power source may comprise, for example, one or more batteries, a solar cell or a combination of the two. Further, the power source may comprise the main vehicle battery if desired. In such an embodiment, the air vent 200 would include an electrical cord and power plug that could be connected to an auxiliary power outlet of the motor vehicle.

After activation, the ventilation fan 202 runs for a predetermined period of time as monitored by the timer component 220. Upon operating for that predetermined period of time, the controller 212 deactivates the ventilation fan 202 and then directs the closure actuator 214 to close the closure 206 thereby sealing the exhaust outlet 204 from intrusion by rain, and insects as well as protecting the interior of the vehicle from potential vandalism.

Figure 10A:
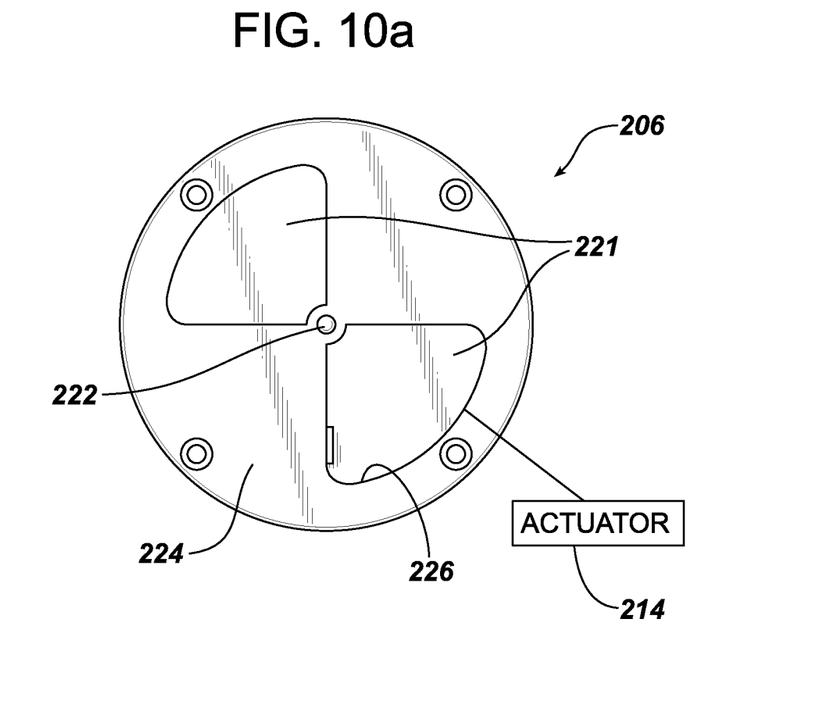
FIGS. 10a-10b are front elevational views illustrating a first embodiment of exhaust outlet closure in respective open and closed positions.
Figure 10B:
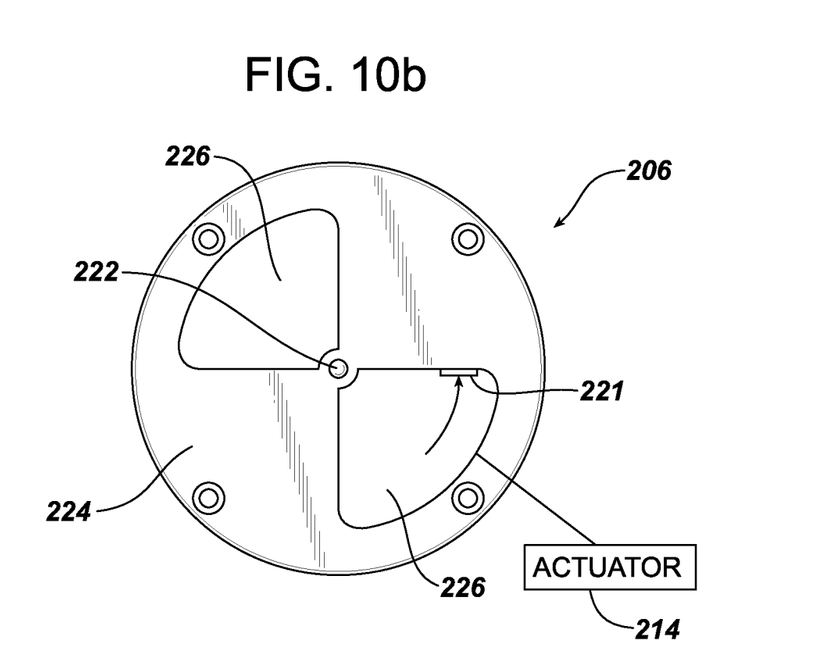

FIGS. 10a and 10b illustrate one possible embodiment of the closure 206 wherein the closure comprises a rotating door 221 connected by pin 222 to a stationary shield 224 including an hourglass shaped vent opening 226. FIG. 10a illustrates the closure 206 in the closed position while FIG. 10b illustrates the closure in the open position.

Figure 11A:
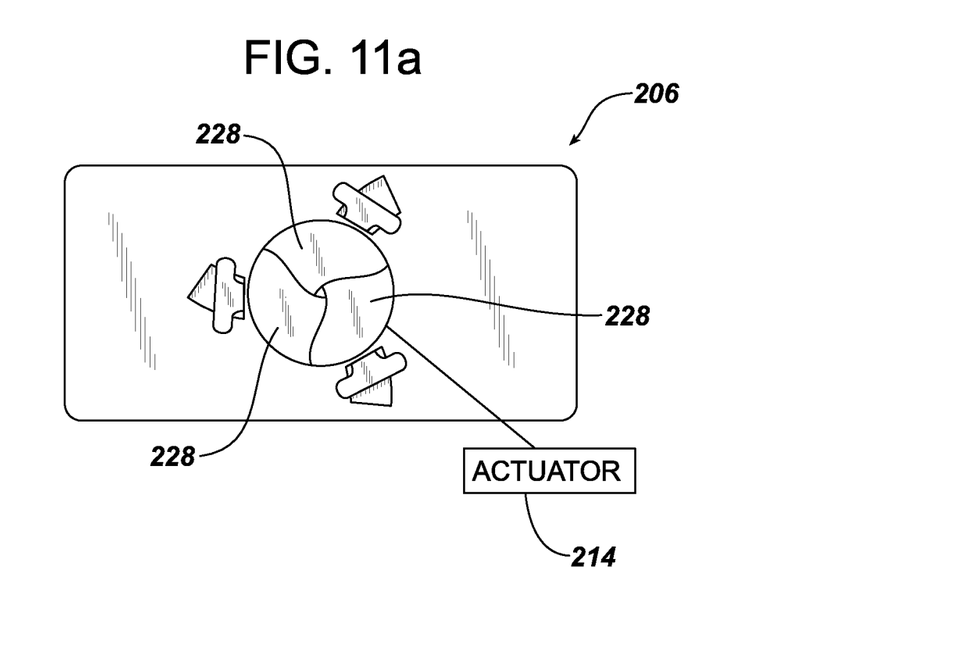
FIGS. 11a-11b are front elevational views illustrating a second embodiment of exhaust outlet closure in respective open and closed positions.
Figure 11B:
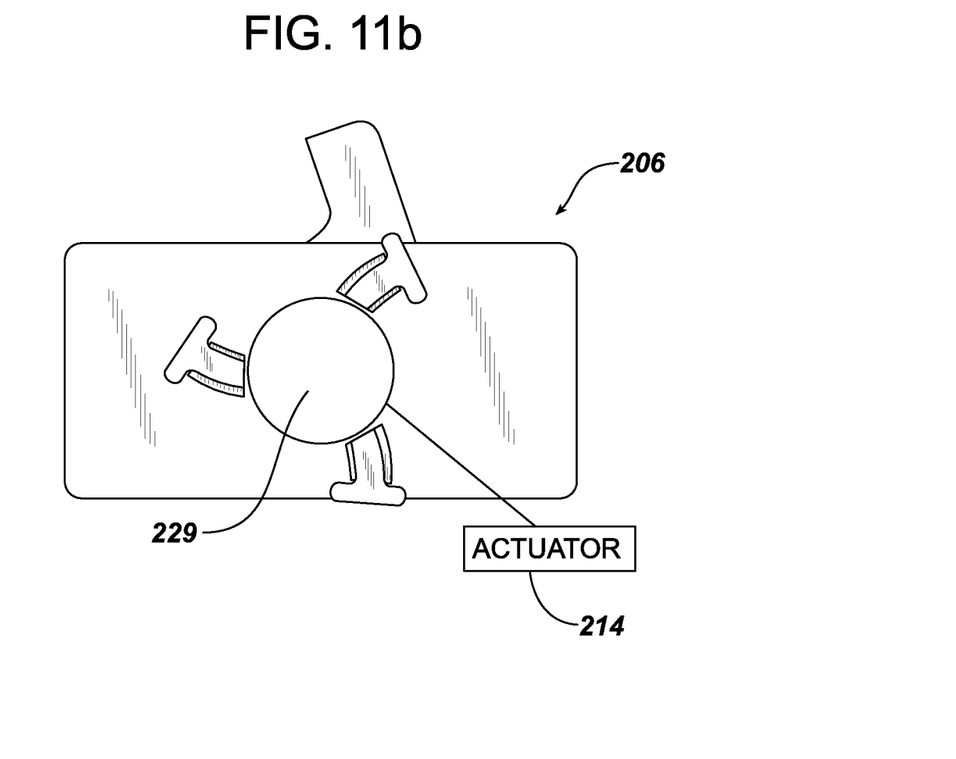

FIGS. 11a and 11b illustrate a second embodiment of closure 206 comprising an iris opening. The iris opening includes three radially displaceable shields 228 that may be closed as illustrated in FIG. 11a and opened as illustrated in FIG. 11b (note open exhaust outlet 229).

Figure 12A:
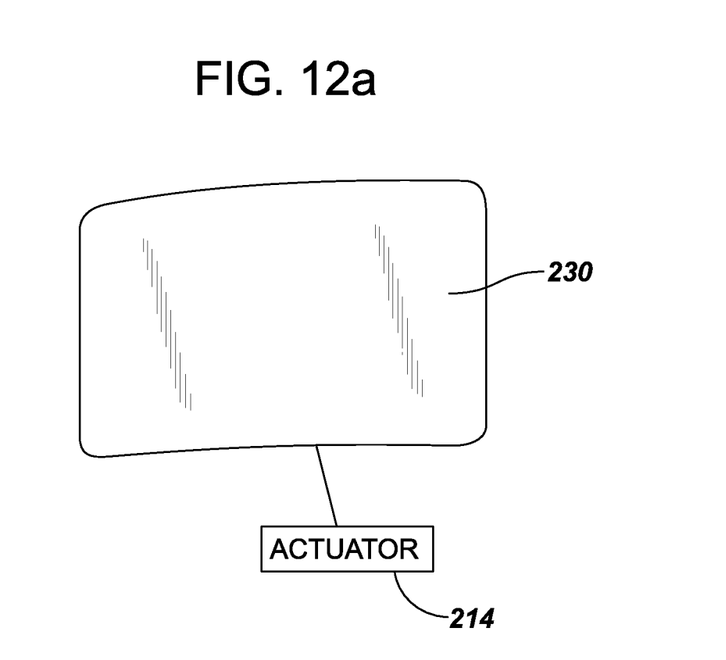
FIGS. 12a-12b are front elevational views illustrating a third embodiment of exhaust outlet closure in respective open and closed positions.
Figure 12B:
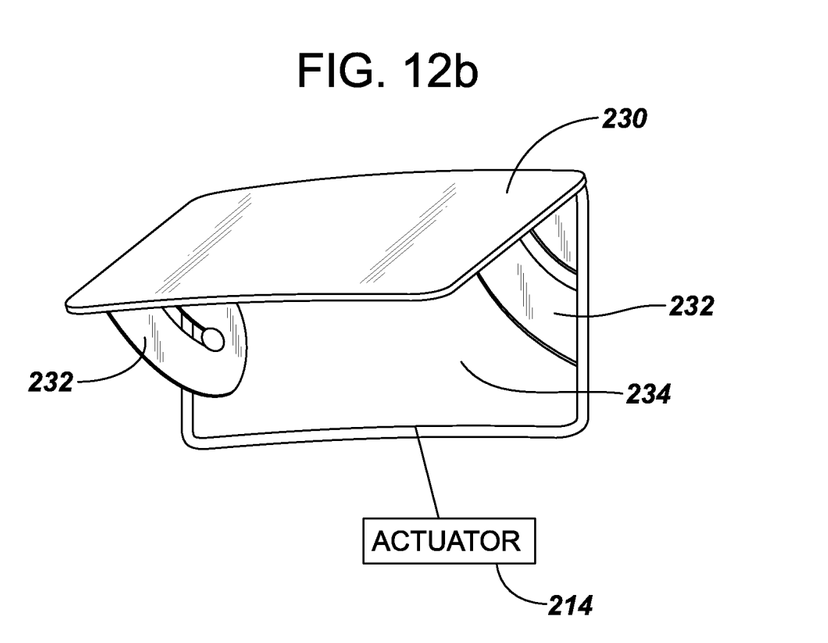

In contrast, FIGS. 12a and 12b illustrate yet another embodiment of closure 206 comprising a pivoting door 230 that is mounted by a hinge 232 to open and close the exhaust opening 234.

The actuator 214 for opening and closing any of the closures 206 may assume a number of different forms including, for example, an electric motor with appropriate drive transmission, a solenoid or the like.

Figure 8:
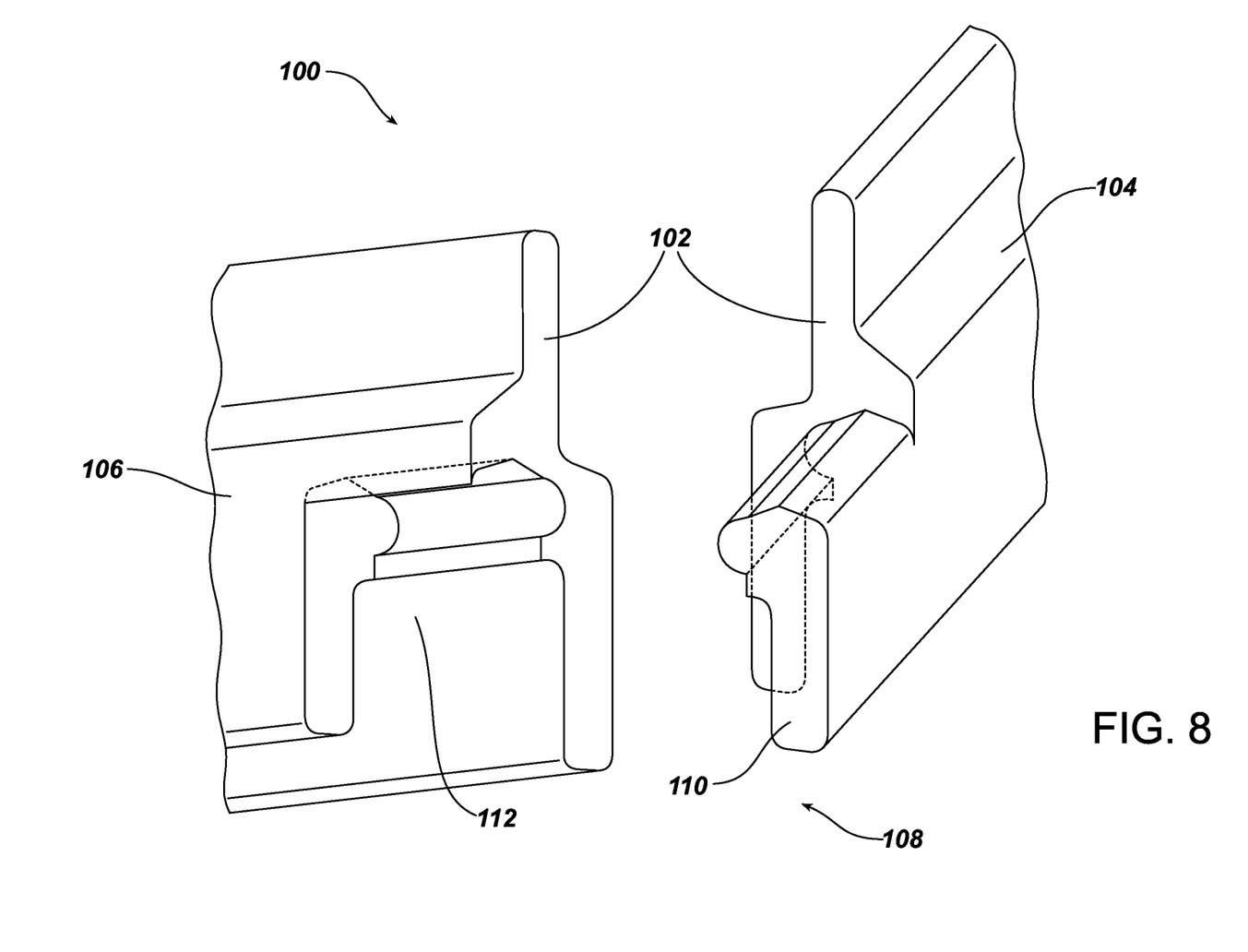
FIG. 8 illustrates an alternative embodiment of air vent incorporating a two piece body.

The foregoing has been presented for purposes of illustration and description. It is not intended to be exhaustive or to limit the embodiments to the precise form disclosed. Obvious modifications and variations are possible in light of the above teachings. For example, while a one-piece body is illustrated in FIGS. 1, 2, 3a-3c and 4-7, it should be appreciated that for certain applications it may be desirable to make the body from multiple pieces that are joined together. FIG. 8 illustrates just such an air vent embodiment 100 including a body 102 made from a first segment 104 and a second segment 106 joined together by means of a lap joint 108 to provide a friction fit. More specifically tab 110 on segment 104 is received in the matching recess 112 on segment 106. If desired an optional adhesive may be utilized in order to complete a secure connection. FIG. 9a shows an air vent 200 incorporating two ventilation fans 202. Clearly the air vent 200 could include a single fan or more than two fans in other embodiments. All such modifications and variations are within the scope of the appended claims when interpreted in accordance with the breadth to which they are fairly, legally and equitably entitled.

What is claimed:

1. An air vent for mounting in a vehicle window frame, comprising:
    a one-piece body having an interior face and an exterior face;
    a passive ventilation feature including an air pathway extending from a first opening in said interior face to a second opening in said exterior face; and
    a forced air ventilation feature carried by said body; said forced air ventilation feature including a ventilation fan, an air exhaust outlet and a closure for said exhaust outlet displaceable between an open position and a closed position.

2. The air vent of claim 1 further including an actuator for opening and closing said exhaust outlet closure.

3. The air vent of claim 1, wherein said actuator is a solenoid.

4. The air vent of claim 1, wherein said actuator is an electric motor.

5. The air vent of claim 1, further including a power source.

6. The air vent of claim 5, wherein said power source is a battery.

7. The air vent of claim 5, wherein said power source is a solar cell.

8. The air vent of claim 7, further including a controller operatively connected to the ventilation fan and the actuator.

9. The air vent of claim 8, further including a temperature sensor and a timer.

10. The air vent of claim 1, wherein said closure comprises a rotating door.

11. The air vent of claim 1, wherein said closure comprises an iris opening with three radially displaceable shields.

12. The air vent of claim 1, wherein said closure comprises a pivoting door.

13. The air vent of claim 1, wherein said body includes an elongated window channel and said air pathway extends downwardly from said first opening to said second opening.

14. The air vent of claim 13, wherein said air pathway includes a central cavity, a first portion of said air pathway extending between said first opening and said central cavity and a second portion of said air pathway extending between said second opening and said central cavity.

15. The air vent of claim 14, wherein said first portion and said second portion of said air pathway are non-coaxial.

16. The air vent of claim 14, wherein said first portion and said second portion of said air pathway are non-planar and non-coaxial.

17. The air vent of claim 14, wherein said air pathway further includes multiple first portions and multiple second portions in communication with said central cavity.

18. The air vent of claim 17, wherein said body includes an elongated mounting flange.

19. The air vent of claim 18, wherein said elongated window channel and said elongated mounting flange extend along two parallel longitudinal axes.

20. An air vent for mounting in a vehicle window frame, comprising:
- a one-piece body having an elongated window channel for receiving a window held in the vehicle window frame; and
- a forced air ventilation feature carried by said body, said feature including a ventilation fan, an exhaust air outlet and a closure for said exhaust air outlet displaceable between an open position and a closed position.

* * * * *